United States Patent
Wakabayashi et al.

(10) Patent No.: US 10,442,269 B2
(45) Date of Patent: Oct. 15, 2019

(54) HOLLOW STABILIZER

(71) Applicant: NHK Spring Co., Ltd., Kanagawa (JP)

(72) Inventors: Yutaka Wakabayashi, Kanagawa (JP);
Ken Takahashi, Kanagawa (JP);
Masato Sugawara, Kanagawa (JP);
Hideki Okada, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 96 days.

(21) Appl. No.: 15/560,892

(22) PCT Filed: Mar. 16, 2016

(86) PCT No.: PCT/JP2016/058278
§ 371 (c)(1),
(2) Date: Sep. 22, 2017

(87) PCT Pub. No.: WO2016/152668
PCT Pub. Date: Sep. 29, 2016

(65) Prior Publication Data
US 2018/0117983 A1    May 3, 2018

(30) Foreign Application Priority Data
Mar. 24, 2015    (JP) .................................. 2015-061552

(51) Int. Cl.
*B60G 21/055*    (2006.01)
*B21D 53/88*    (2006.01)
(Continued)

(52) U.S. Cl.
CPC ........... *B60G 21/055* (2013.01); *B21D 7/165* (2013.01); *B21D 53/88* (2013.01); *C21D 9/08* (2013.01);
(Continued)

(58) Field of Classification Search
CPC .................. B60G 21/055; B60G 2206/427
See application file for complete search history.

(56) References Cited

U.S. PATENT DOCUMENTS 4,365,824 A * 12/1982 Ohno ................... B60G 21/055
267/273
2002/0170177 A1* 11/2002 Koyama ................. B23P 15/00
29/897.2
(Continued)

FOREIGN PATENT DOCUMENTS

JP       S56127731 A       10/1981
JP       S57134520 A        8/1982
(Continued)

OTHER PUBLICATIONS

Japanese Office Action for Application No. 2015-061552, dated Sep. 11, 2018.
(Continued)

*Primary Examiner* — Keith J Frisby
(74) *Attorney, Agent, or Firm* — Marshall, Gerstein & Borun LLP

(57) ABSTRACT

A hollow stabilizer has a tubular shape and is provided with a torsion section that is provided to a vehicle and that extends in the vehicle width direction; an arm section that extends in the front-back direction of the vehicle; and bent sections that connect the torsion section and the arm section. The hardness of the outer surface of the bent inner sides of the bent sections of the hollow stabilizer is 70% or more with respect to the hardness of the outer surface of the arm section.

2 Claims, 14 Drawing Sheets

(51) Int. Cl.
  *C21D 9/08* (2006.01)
  *B21D 7/16* (2006.01)
(52) U.S. Cl.
  CPC ........ *C21D 9/085* (2013.01); *B60G 2206/012* (2013.01); *B60G 2206/427* (2013.01); *B60G 2206/724* (2013.01); *B60G 2206/8402* (2013.01)

(56) References Cited

U.S. PATENT DOCUMENTS

| | | |
|---|---|---|
| 2007/0216126 A1 | 9/2007 | Lopez et al. |
| 2013/0093153 A1 | 4/2013 | Ito et al. |
| 2013/0113175 A1 | 5/2013 | Renner et al. |
| 2013/0160903 A1 | 6/2013 | Seo |
| 2015/0176101 A1 | 6/2015 | Ishitsuka et al. |
| 2015/0184267 A1 | 7/2015 | Koshita et al. |
| 2015/0247227 A1 | 9/2015 | Katsumura et al. |

FOREIGN PATENT DOCUMENTS

| | | |
|---|---|---|
| JP | S58141332 A | 8/1983 |
| JP | S63186831 A | 8/1988 |
| JP | H01111848 A | 4/1989 |
| JP | 9-031541 A | 2/1997 |
| JP | 2000-024737 A | 1/2000 |
| JP | 2001-152315 A | 6/2001 |
| JP | 2002-331326 A | 11/2002 |
| JP | 2004-009126 A | 1/2004 |
| JP | 2010-228555 A | 10/2010 |
| JP | 2011-189892 A | 9/2011 |
| JP | 2012-052197 A | 3/2012 |
| JP | 2013-086798 A | 5/2013 |
| JP | 2014043922 | 3/2014 |
| KR | 10-2014-0048429 A | 4/2014 |
| WO | WO-2013/175821 A1 | 11/2013 |
| WO | WO-2014/054287 A1 | 4/2014 |

OTHER PUBLICATIONS

English Translation of Japanese Office Action for Application No. 2015-061552, dated Apr. 3, 2018.
English Translation of International Search Report and Written Opinion for Application No. PCT/JP2016/058278, dated May 31, 2016.
European Search Report for European Patent Application No. 18164346.1, dated Sep. 3, 2018.

* cited by examiner

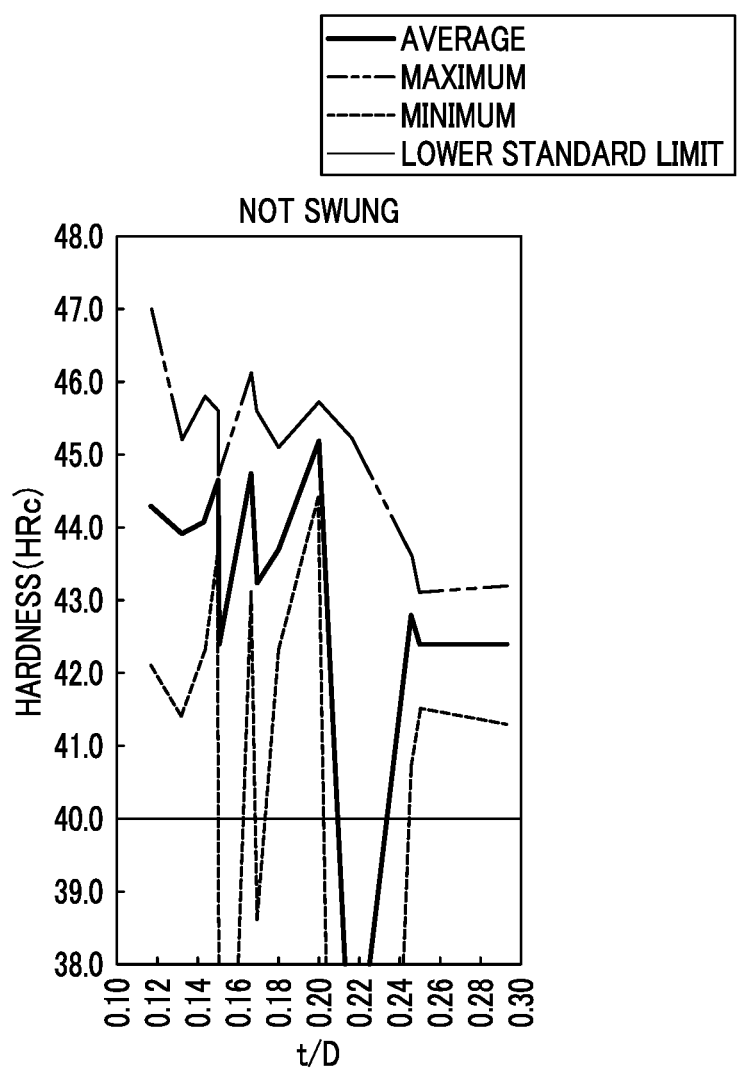

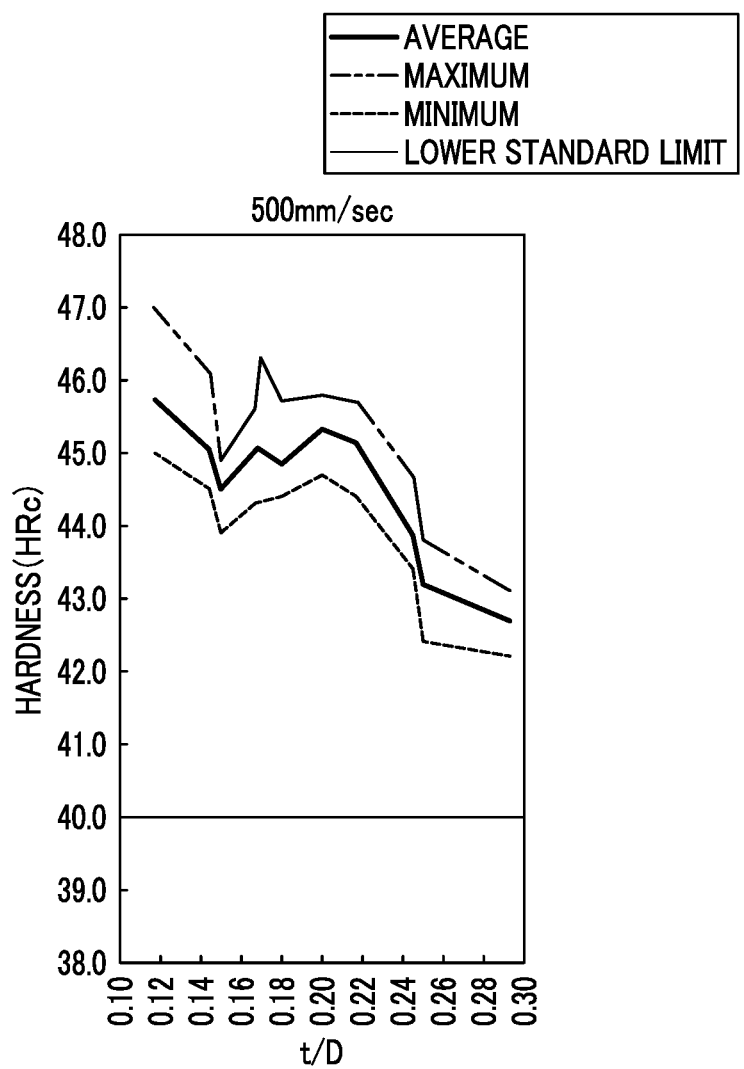

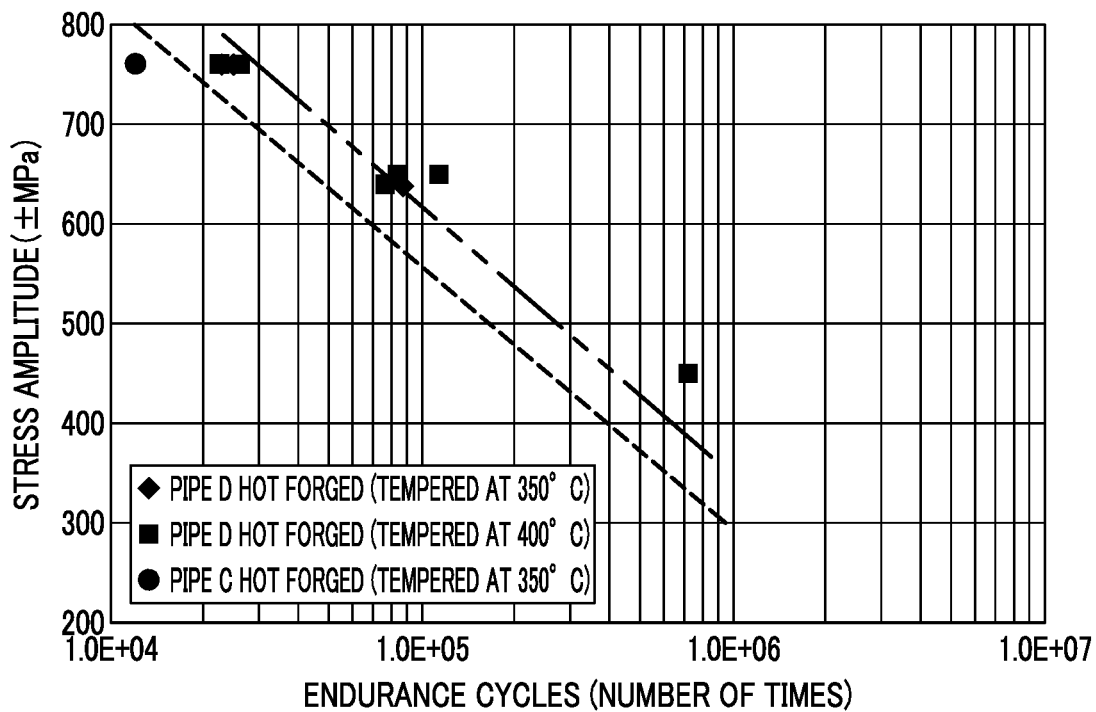
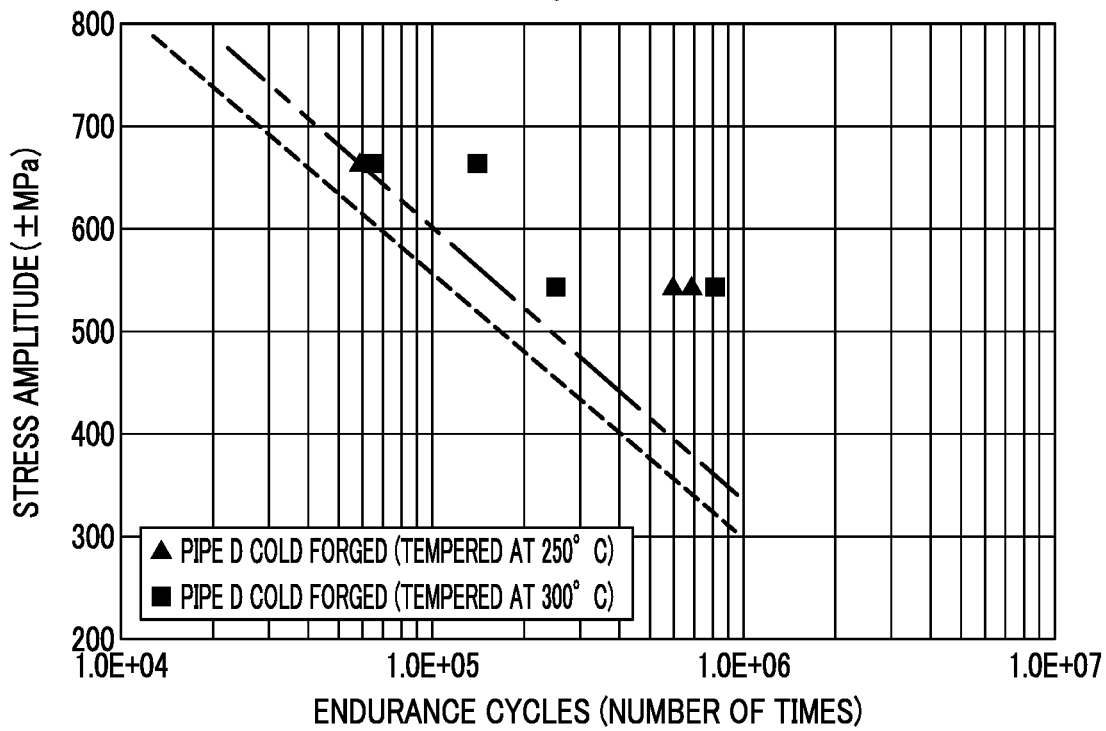

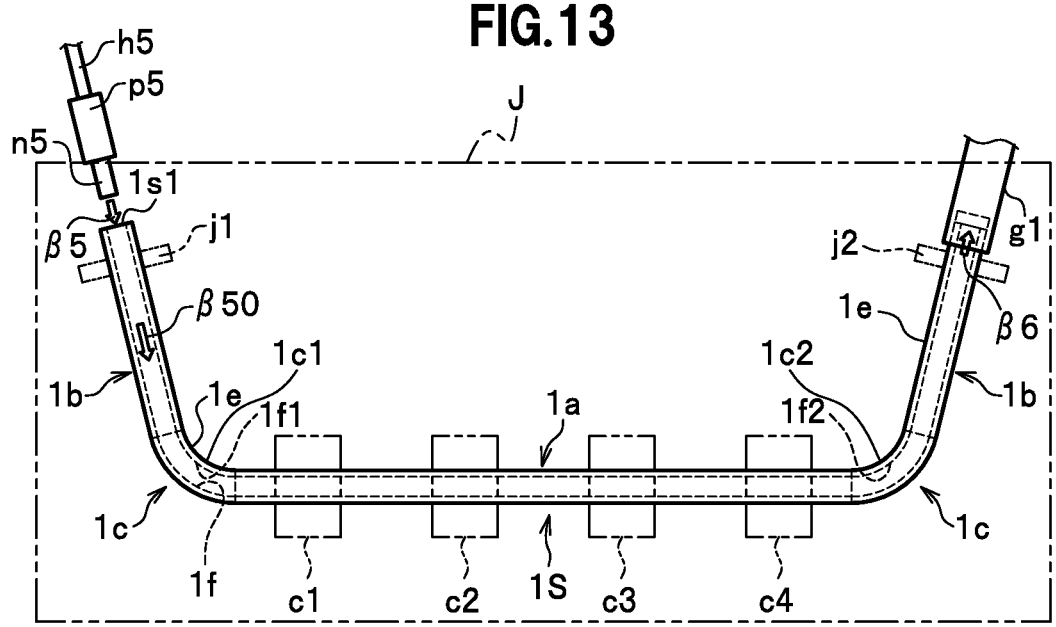

HOLLOW STABILIZER

TECHNICAL FIELD

The present invention relates to a hollow stabilizer having a hollow structure.

BACKGROUND ART

A vehicle such as an automobile is equipped with a stabilizer (a stabilizer bar or an anti-roll bar) for reducing the body roll of the vehicle which is caused by upward and downward shifts of the wheels. Generally, the stabilizer is made from a substantially U-shaped bar body, and includes: a torsion section extending in the vehicle width direction; and a pair of left and right arm sections bent in the vehicle front-rear direction. In the vehicle, the stabilizer is supported and suspended between the left and right suspensions of the wheels, with the distal ends of the arm sections respectively linked to the suspensions, and with the torsion section inserted through the bushes fixed to the vehicle body.

While the vehicle is cornering, or while the vehicle is running over a bump on the road surface, upward and downward motions of the left and right wheels make the strokes of the left and right suspensions differ from each other. In this case, load (displacement) caused by the difference in stroke between the suspensions is inputted into the arm sections of the stabilizer; resultant load (displacement difference) from the arm sections twists the torsion section; and the torsion section produces elastic force for recovering from the twist deformation. Using the elastic force for recovering from the twist deformation, the stabilizer reduces the difference in vertical displacement between the left and right wheels, increases the roll stiffness of the vehicle body, and accordingly reduces the body roll of the vehicle.

There are two structurally-different types of stabilizers: a solid stabilizer having a solid structure, and a hollow stabilizer having a hollow structure. The features of the solid stabilizer include excellence in mechanical strength and reduction in manufacturing costs. In contrast to this, the hollow stabilizer is in the form suitable to reduce the weight of the vehicle, although having difficulty in achieving mechanical strength in comparison with the solid stabilizer. In general, electroseamed steel pipe, seamless steep pipe, forge welded steel pipe and the like are used as materials for the hollow stabilizer. Among these steel pipes, electroseamed steel pipe is used most as the material for the hollow stabilizer because of its low manufacturing costs and excellent mass productivity.

Conventional materials generally used for stabilizers are carbon steels such as S48C (JIS), and spring steels such as SUP9 (JIS) and SUP9A (JIS) having excellent mechanical strength such as tensile strength, and excellent fatigue resistance. Hollow stabilizers are often produced by bending steel pipe made of spring steel into a product shape, followed by heat treatment. As the bending process, cold bending using NC benders, hot bending using a bending die for a whole stabilizer, or the like is performed depending on the thickness and diameter of steel pipe.

As the heat treatment, quenching and tempering are performed. As a method of quenching, oil quenching is used most often. Heat-treated pipe is made into a product usually through a surface treatment process such as shot peening, and a finishing process such as coating.

Inventions publicly known by documents related to this application are disclosed in Patent Literatures 1, 2 listed below.

For example, Patent Literature 1 discloses that electric-resistance welded steel pipe for hollow stabilizers where a percent ratio of plate thickness t to outer diameter D is $t/D \geq 20\%$ is achieved by using electric-resistance welded steel pipe which is obtained by diameter-reduction rolling after electric-resistance welding.

Patent Literature 2 discloses, as a technique for securing durability for stabilizers, a hollow stabilizer manufacturing method which includes: subjecting electroseamed pipe to diameter reduction within a hot or warm temperature range to make a ratio of plate thickness to outer diameter fall within 18 to 35%; and forming the diameter-reduced electroseamed pipe into a stabilizer shape, followed by heat-treatment, shot-peening and coating.

CITATION LIST

Patent Literature

Patent Literature 1: Japanese Patent Application Publication No. 2004-009126
Patent Literature 2: Japanese Patent Application Publication No. 2002-331326

SUMMARY OF INVENTION

Technical Problem

The mainstream of the stabilizer has been a solid stabilizer having a solid structure. Nowadays, there has been a strong demand for a reduction in weight of a vehicle from the viewpoint of improving fuel economy. Against this background, there has been a demand for a reduction in weight of the stabilizer, and hollow stabilizers having hollow structures (pipe shapes) are becoming used widely.

The hollow stabilizer, however, has a weak point in that the hollow structure results in a low section modulus, low flexural rigidity (EI) and so on, and accordingly the strength is disadvantageous as compared with the solid stabilizer having a solid structure.

Meanwhile, there has been a tendency toward an increase in weight of the vehicle because: the vehicle produced as a hybrid vehicle or an electric vehicle is equipped with a motor and a rechargeable battery for storing regenerative energy along with the advancement of electrification of the vehicle.

Against this background, there is need for a hollow stabilizer which is lighter in weight but has high strength.

As discussed above, although the hollow stabilizer having a hollow structure is light in weight, the strength of the hollow stabilizer is lower than that of the solid stabilizer having a solid structure because the hollowness decreases the section modulus.

Meanwhile, in the quenching process, the temperature raises locally at the bent sections of the hollow stabilizer in electric heating in some cases because electric current density increases due to the U-bent shape. On the other hand, the cooling rate in cooling tends to below in the bent sections due to the U-bent shape. As a result, there is risk that the bent sections are insufficiently quenched with the result of low hardness.

In addition, the bent sections of the hollow stabilizer are high-stress areas where both high bending stress and high torsional stress occur. For this reason, the bent sections are areas most strongly desired to achieve enhancement in strength and fatigue strength (durability) of the hollow stabilizer. If the plate thickness of the hollow stabilizer is increased, however, the hollow stabilizer is more insufficiently quenched. On the other hand, as discussed above, the solid stabilizer with a solid structure has a disadvantage of heavy weight although having high section modulus and high strength.

The present invention has been made with the above circumstances taken into consideration. An object of the present invention is to provide a high-strength light-weight hollow stabilizer whose bent sections have improved hardness.

Solution to Problem

For the purpose of solving the above mentioned problems, a hollow stabilizer according to the present invention includes: a torsion section extending in a vehicle width direction; an arm section extending in a vehicle front-rear direction; and a bent section connecting the torsion section and the arm section. Hardness of an outer surface of an inner bend side of the bent section is at least 70% of hardness of an outer surface of the arm section.

In the hollow stabilizer according to the present invention, the hardness of the outer surface of the inner bend side of the bent section is at least 70% of the hardness of the outer surface of the arm section. For this reason, it is possible to obtain the hollow stabilizer having high fatigue resistance.

A hollow stabilizer according to the present invention includes: a torsion section extending in a vehicle width direction; an arm section extending in a vehicle front-rear direction; and a bent section connecting the torsion section and the arm section. A hardness increasing treatment is performed on the bent section locally or from an inner surface side of the bent section.

In the hollow stabilizer according to the present invention, the bent section is treated locally or from the inner surface side to increase the hardness of the bent section. The increase in the hardness of the bent section makes it possible to inhibit fatigue failure in the bent section A hollow stabilizer according to the present invention includes: a torsion section extending in a vehicle width direction; an arm section extending in a vehicle front-rear direction; and a bent section connecting the torsion section and the arm section. Quenching is performed by jetting a coolant onto an outer surface of an inner bend side of the bent section.

In the hollow stabilizer according to the present invention, the hollow stabilizer is quenched by jetting the coolant onto the outer surface of the inner bend side of the bent section. For this reason, it is possible to increase the hardness of the bent section, and thereby to inhibit fatigue failure in the bent section.

A hollow stabilizer according to the present invention includes: a torsion section extending in a vehicle width direction; an arm section extending in a vehicle front-rear direction; and a bent section connecting the torsion section and the arm section. Quenching is performed by jetting a coolant into the hollow stabilizer.

In the hollow stabilizer according to the present invention, the hollow stabilizer is quenched by jetting the coolant into the hollow stabilizer. For this reason, it is possible to increase the hardness of the inner bend side of the bent section, and thereby to inhibit fatigue failure.

Advantageous Effects of Invention

According to the present invention, it is possible to provide a high-strength light-weight hollow stabilizer whose bent sections have an improved hardness.

BRIEF DESCRIPTION OF DRAWINGS

FIG. 6A is a diagram for comparing a Rockwell hardness (HRC) of the hollow raw pipe not swung.

FIG. 6C is a diagram for comparing a Rockwell hardness (HRC) of the hollow raw pipe swung at a swing speed of 500 mm/sec.

FIG. 9 is an S-N diagram illustrating a comparison of: the durability of a steel C which was obtained by forming the hollow raw pipe at approximately 900° C. to approximately 1200° C. inclusive, and thereafter tempered at tempering temperature of 350° C.; and the durability of each of steels D which were obtained by forming the hollow raw pipe at approximately 900° C. to approximately 1200° C. inclusive, and thereafter tempered respectively at tempering temperatures of 350° C. and 400° C.

FIG. 10 is an S-N diagram illustrating a comparison of the durabilities of the steel D shaped at approximately 720° C. or lower, and tempered at tempering temperatures of 250° C. and 300° C.

FIG. 13 is a top diagram illustrating how the bent hollow raw pipe is quenched from its inner surface in a quenching method using inner surface jet of another example.

DESCRIPTION OF EMBODIMENTS

Hereinafter, a hollow stabilizer of an embodiment of the present invention will be described with reference to the accompanying drawings. Note that components common to the drawings will be denoted by the same reference signs, and duplicate descriptions for such components will be omitted.

Figure 1A:
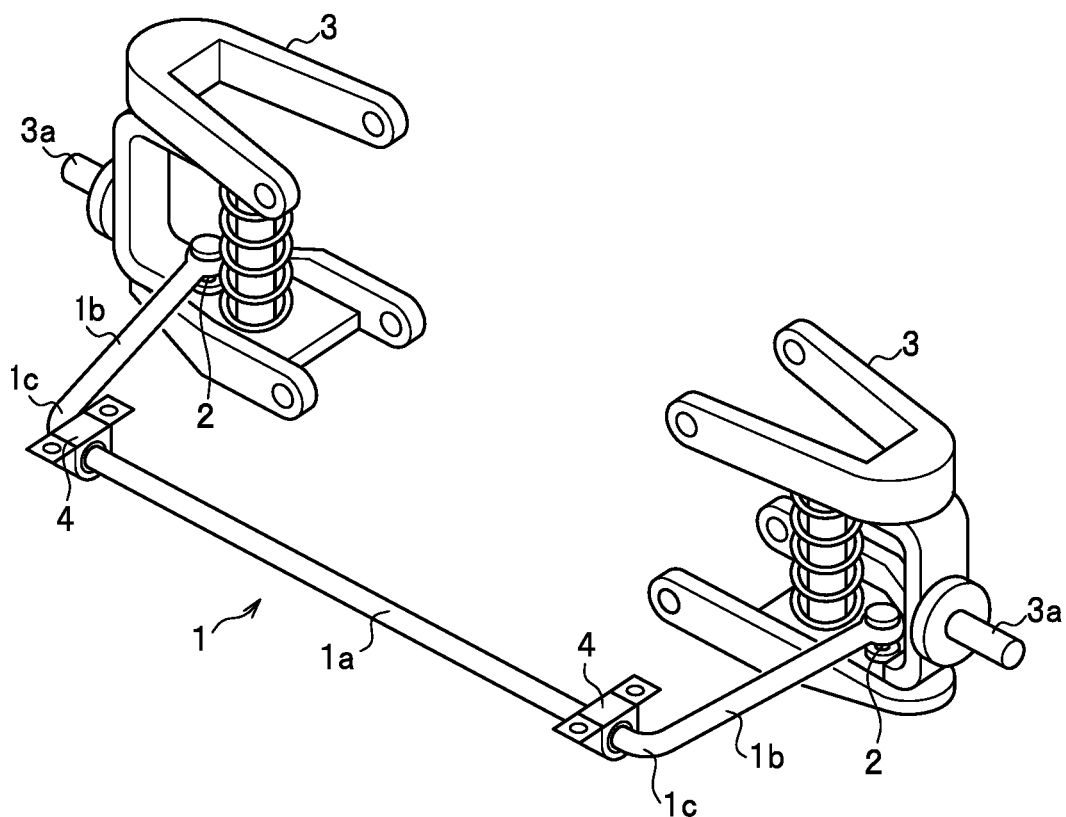
FIG. 1A is a perspective view of a hollow stabilizer of an embodiment of the present invention as connected to suspensions provided to a vehicle.
Figure 1B:
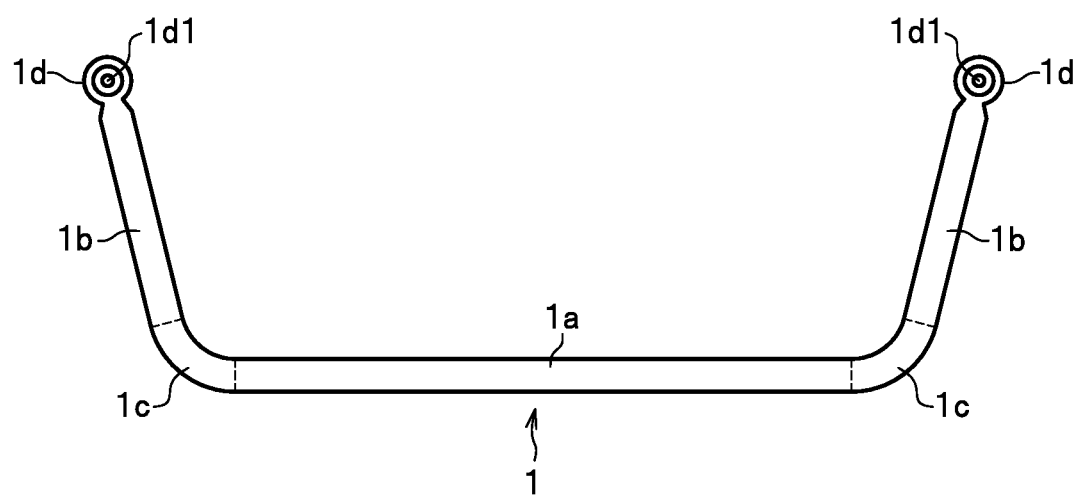
FIG. 1B is a plan view of the hollow stabilizer of the embodiment of the present invention as connected to the suspensions provided to the vehicle.

FIG. 1A is a perspective view of the hollow stabilizer of an embodiment of the present invention as connected to suspensions provided to a vehicle. FIG. 1B is a plan view of the hollow stabilizer of the embodiment of the present invention as connected to the suspensions provided to the vehicle.

The hollow stabilizer 1 of the embodiment is a pipe-shape stabilizer formed from hollow steel pipe.

The hollow stabilizer 1 includes: a torsion section 1a extending in a vehicle width direction; and a pair of left and right arm sections 1b, 1b each extending in a vehicle front-rear direction.

The hollow stabilizer 1 is substantially U-shaped such that the hollow stabilizer 1 is bent at bent sections 1c, 1c (illustrated in FIG. 1B with dashed lines) which are symmetrically located at the respective two ends of the torsion section 1a extending in a vehicle width direction, and continues to the pair of left and right arm sections 1b, 1b.

It should be noted that the configuration of the hollow stabilizer 1 may include two or more bent sections 1c.

The outer diameter D and the plate thickness t of the torsion section 1a of the hollow stabilizer 1 are approximately 10 mm to approximately 43 mm, and approximately 2 mm to approximately 10 mm, respectively. The below-referred t/D means the quotient of the division of the plate thickness t by the outer diameter D.

The arm sections 1b, 1b include flat plate-shaped connecting portions (eyeball portions) 1d, 1d, at their distal ends, for serving as attachment portions. The connecting portion (eyeball portions) 1d, 1d are formed, by press working, into a flat plate shape to include attachment holes 1d1, 1d1.

The connecting portions 1d, 1d at the distal ends of the arm sections 1b, 1b are linked to a pair of left and right suspensions 3,3 fixed to the vehicle body (not illustrated) with the assistance of stabilizer links 2,2, respectively. A wheel (not illustrated) is attached to an axle 3a of each suspension 3. The suspension 3 includes a compression spring and an oil damper, and functions to transmit impacts, vibrations and the like from the wheel to the vehicle body while dampening the impact, vibration and the like using internal friction and viscous drag.

The torsion section 1a is suspended from a cross member (not illustrated) or the like of the vehicle body, between the left and right suspensions 3, 3, by being inserted through rubber-made bushes 4 which is fixed to the cross member or the like.

When upward and downward movements of the left and right wheels make the strokes of the left and right suspensions 3, 3 become different from each other, the foregoing configuration transmits load caused by the displacement from the suspensions 3, 3 to the arm sections 1b, 1b, and the transmitted load torsionally deforms the torsion section 1a. Thus, the torsion section 1a produces elastic force for restoring its original shape from the torsional deformation. Using the elastic force against the torsional deformation, the hollow stabilizer 1 increases the roll stiffness by reducing the left and right tilt of the vehicle body, and thereby stabilizes the run of the vehicle.

Manganese-boron steel is used for the hollow stabilizer 1.

<Raw Pipe for Hollow Stabilizer 1>

Figure 2A:
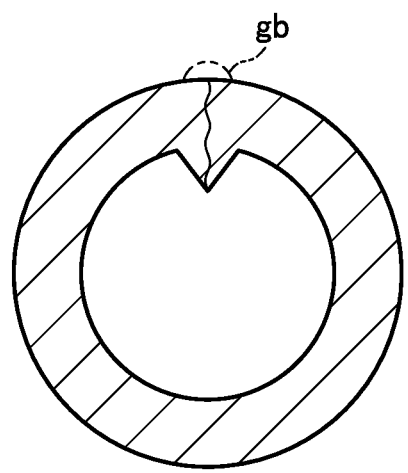
FIG. 2A is a transverse cross-sectional view illustrating electroseamed pipe.
Figure 2B:
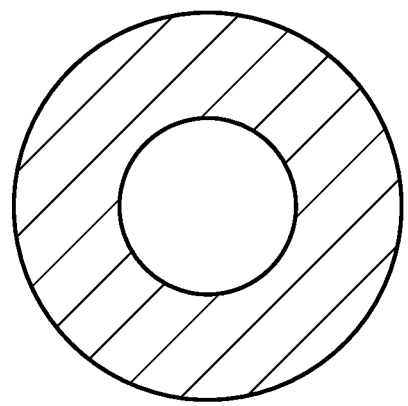
FIG. 2B is a transverse cross-sectional view illustrating stretch reduced (SR) pipe.

Electroseamed pipe, stretch reduced (SR) pipe (hot-rolled electroseamed steel pipe), electroseamed drawn steel pipe, and the like are usable as hollow pipe to be used for the hollow stabilizer 1. FIG. 2A is a transverse cross-sectional view illustrating electroseamed pipe. FIG. 2B is a transverse cross-sectional view illustrating SR pipe.

Electroseamed pipe is produced by: forming steel plate into a pipe shape by rolls during hot mill processing; and thereafter joining open edges by electric-resistance welding to form the seam of the pipe which extends in the longitudinal direction of the pipe. After that, the outer surface bead gb on the seam of the pipe shown in FIG. 2A is trimmed out by machining because the outer surface bead gb is likely to cause functional obstructions.

SR pipe is produced by: subjecting electroseamed pipe with a large diameter to high-frequency heating; thereafter, forming the resultant pipe into a pipe with a decreased diameter and an increased thickness, that is to say, thick small-diameter electroseamed pipe by hot-drawing (see FIG. 2B).

For example, electroseamed pipe is used for the hollow stabilizer 1 with: an outer diameter is approximately 12 mm to approximately 44 mm; and a plate thickness t is approximately 2 mm to approximately 6.5 mm. In this case, electroseamed pipe is made into the hollow stabilizer 1 where t/D is 0.09 to 0.22 approximately.

Otherwise, SR pipe is used for the hollow stabilizer 1 with: an outer diameter of approximately 12 mm to approximately 44 mm; and a plate thickness t of approximately 2 mm to approximately 6.5 mm. In this case, electroseamed pipe is made into the hollow stabilizer 1 where t/D is 0.12 to 0.31 approximately.

For the purpose of achieving mechanical characteristics uniform to the depth in the hollow stabilizer 1, it is preferable that: the quenching depth be sufficiently large; and thereby, hard martensite be formed in the main phase of the metallographic structure up to its center portion in its transverse cross-sectional view.

The hollow stabilizer 1 is formed from the metallographic structure with a martensitic main phase by quenching which includes dipping the hollow stabilizer 1 into the coolant, jetting the coolant onto the hollow stabilizer 1, and jetting the coolant into the hollow stabilizer 1, which will be described later.

Meanwhile, in a case where tensile stress remains in the hollow stabilizer 1, the tensile stress helps the hollow stabilizer 1 to cause or develop cracks due to external force, repeated load and the like, and the hollow stabilizer 1 accordingly becomes easily broken soon. In contrast to this, in a case where compressive residual stress remains in the hollow stabilizer 1, the compressive residual stress works to offset tensile load such as the external force and the repeated load, and this crack inhibiting effect makes it possible to extend the life of the hollow stabilizer 1.

As discussed above, the residual stress has a close relationship with the life of the metal material, and has a significant influence particularly on metal fatigue in which repeated load gradually develops cracks.

For this reason, it is preferable that compressive residual stress be provided to the surface layer of the base body of the hollow stabilizer 1.

When a hollow raw pipe for the hollow stabilizer 1 is quenched, thermal stress causes compressive residual stress, and transformation stress causes tensile residual stress. Depending on how these stresses are combined, surface residual stress shows a certain distribution. In the near-surface portion of the hollow pipe, compressive residual stress is the stronger in the thermal stresses caused by water quenching.

With this taken into consideration, for the purpose of making the thermal stress leaving the compressive residual stress stronger than the deformation stress leaving the tensile residual stress, it is preferable to select a quenching condition for achieving a large cooling rate which is suitable to generating the thermal stress. Furthermore, it is preferable that a certain or larger amount of compressive residual stress be made to exist in a part of the hollow stabilizer 1 which is so deep that corrosion pits which is a factor related to the corrosion durability cannot reach the part.

For this reason, to produce the hollow stabilizer 1, the quenching is performed using a medium with a heat transfer coefficient equal to, greater than, or close to that of water, as the coolant. Here, the quenching will be described by using the water quenching as its example.

In the case where the hollow stabilizer 1 is made from SR pipe, there is likelihood that the inner sides of the bent sections 1c, 1c (see FIGS. 1A and 1B) of the hollow stabilizer 1 cannot be fully quenched. One may consider the insufficient quenching comes from a decrease in a cooling rate caused by the increased thickness and the shape of the bent sections 1c, 1c which makes it difficult for water to hit the bent sections 1c, 1c. The insufficient quenching adversely affects the durability of the hollow stabilizer 1.

With this taken into consideration, the hollow stabilizer 1 is subjected to normal water quenching, and complimentarily to local quenching using jet water streams, which will be described later.

<Metallographic Structure of Hollow Stabilizer 1>

The hollow stabilizer 1 has the metallographic structure with the martensitic main phase. To put it specifically, at least 90% of the metallographic structure of the hollow stabilizer 1 has martensitic structure.

Transformation of the metallographic structure of the hollow stabilizer 1 into the martensitic structure makes it possible to improve the static strength, endurance strength, fatigue characteristics and the like. In addition, the existence of the single phase in the martensitic structure makes local-action-cells hard to form, and accordingly improves corrosion resistance.

<Stress Analysis on Hollow Stabilizer 1>

Next, descriptions will be provided for results of comparing the hollow stabilizer 1 of the embodiment with a solid stabilizer in terms of weight using t (plate thickness)/D (outer diameter), and results of qualitatively and relatively comparing stress which occurs in the outer and inner surfaces 1f, 1e of the hollow stabilizer 1 with stress which occurs in the outer and inner surfaces of the solid stabilizer.

Figure 3:
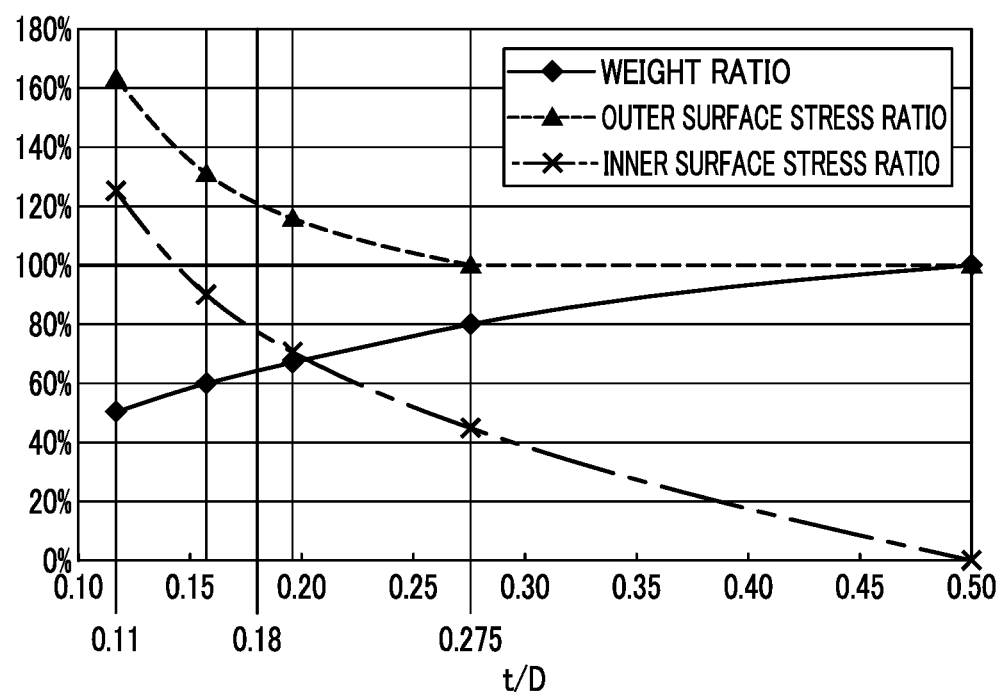
FIG. 3 is a diagram for comparing a solid stabilizer and a hollow stabilizer in an equivalent size in terms of weight, outer surface stress and inner surface stress.

FIG. 3 is a diagram for comparing the solid stabilizer and the hollow stabilizer in an equivalent size in terms of weight, outer surface stress and inner surface stress. The horizontal axis represents t (plate thickness)/D (outer diameter), and the vertical axis represents the weight (the solid line), the outer surface stress (the dashed line) and the inner surface stress (the dash-dotted line).

FIG. 3 illustrates how the weight, outer surface stress and inner surface stress of the hollow stabilizer change relative to those of the solid stabilizer each expressed as 100%. To put it specifically, the weight and outer surface stress of the solid stabilizer are each expressed as 100%, whereas the inner surface stress of the solid stabilizer is expressed as 0% because the solid stabilizer has no inner surface and accordingly causes no inner surface stress.

The weight of the solid stabilizer is expressed as 100%. As t/D decreases (the plate thickness t decreases), the weight ratio decreases quadratically because a change in the plate thickness t means a change in the diameter.

The hollow stabilizer where t/D is less than that of the solid stabilizer has a smaller sectional area. Accordingly, the outer surface stress and inner surface stress of the hollow stabilizer tend to increase.

The outer surface stress of the hollow stabilizer with t/D of 0.275 or less is equal to that of the solid stabilizer. The outer surface stress increases of the hollow stabilizer as t/D decreases below approximately 0.275.

It should be noted that the weight of the hollow stabilizer with t/D of approximately 0.275 can be decreased by approximately 20%.

The inner surface stress of the solid stabilizer is expressed as 0%. As t (plate thickness) decreases (t/D decreases), the sectional area decreases, and the inner surface stress accordingly increases. When t/D is approximately 0.275 or less, the inner surface stress changes more than the outer surface stress.

When t/D is approximately 0.18 or less, fatigue failure starts from the inner surface. When t/D is approximately 0.18 or less, the inner surface stress and the outer surface stress both increase quickly.

For this reason, when t/D is approximately 0.18 or less, it is more important to increase the hardness of the inner surface.

Since as discussed above, the inner surface stress and the outer surface stress both increase quickly when t/D is approximately 0.18 or less, it is more necessary that the hardness be increased on the inner surface side and the outer surface side.

Furthermore, since the hollow stabilizer 1 has a thick plate thickness with t/D of approximately 0.18 to 0.275, there is likelihood that as discusses above, the inner side of each bent section 1c is not fully quenched.

On the other hand, when t (plate thickness) is thick and t/D is 0.275 or greater, which is close to that of the solid stabilizer, one may consider that the inner surface stress does not have to be managed because the outer surface stress of the hollow stabilizer is equal to that of the solid stabilizer and the inner surface stress of the hollow stabilizer is low.

<Example of Method of Manufacturing Hollow Stabilizer 1>

Next, descriptions will be provided for an example of a method of manufacturing the hollow stabilizer of the embodiment.

Figure 4:
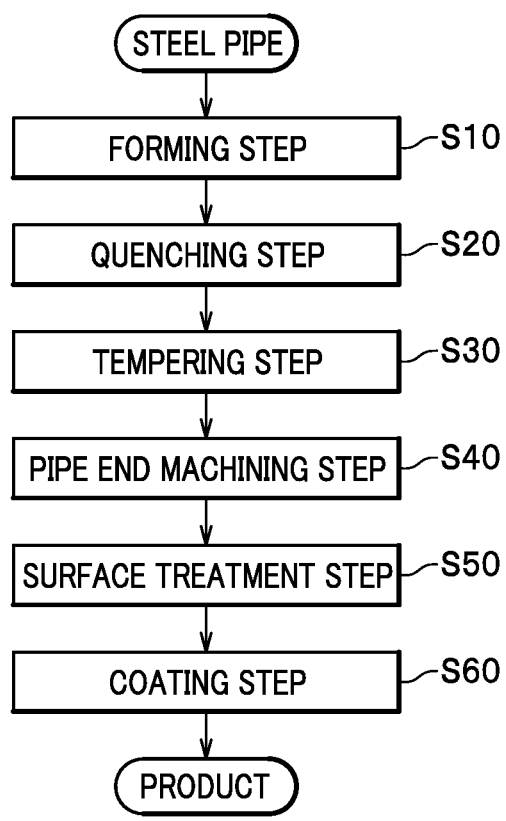
FIG. 4 is a process diagram illustrating a method of manufacturing the hollow stabilizer of an embodiment of the present invention.

FIG. 4 is a process diagram illustrating the method of manufacturing the hollow stabilizer of the embodiment of the present invention.

The hollow stabilizer manufacturing method illustrated in FIG. 4 includes a forming step S10, a quenching step S20, a tempering step S30, a pipe end machining step S40, a surface treatment step S50 and a coating process S60 in this order.

As discussed above, for example, manganese-boron steel is used as the material of the hollow stabilizer 1. The raw material is pipe-shaped hollow pipe material.

The length and diameter of the hollow pipe material as the raw material may be set at appropriate dimensions, respectively, depending on the desired product shape.

As discussed above, when electroseamed pipe is used for the hollow stabilizer, the outer diameter of the torsion section 1a is set within the range of approximately 12 mm to approximately 44 mm, and the plate thickness t of the torsion section 1a is set within the range of approximately 2 mm to approximately 6.5 mm. In this case, t/D is 0.09 to 0.22 approximately. When SR pipe is used for the hollow stabilizer, for example, the outer diameter of the torsion section 1a is set within the range of approximately 12 mm to approximately 44 mm, and the plate thickness t of the torsion section 1a is set within the range of approximately 2 mm to approximately 10 mm. In this case, t/D is 0.12 to 0.31 approximately. When t/D is approximately 0.09 or less, the diameter is so small that it is difficult for hollow stabilizer to maintain the circular cross section, and accordingly to manufacture the hollow stabilizer.

For example, hot-rolled steel material is used for the hollow pipe material.

The foregoing hot-rolled steel material is made into the above-discussed electroseamed pipe, SR pipe or the like. Hollow raw pipe 1S is prepared from the electroseamed pipe, the SR pipe or the like to manufacture the hollow stabilizer 1 of a predetermined length.

The forming step S10 is a step of forming the hollow raw pipe 1S into a shape close to the product shape by: heat-treating the hollow raw pipe 1S for a bending process; and bending the thus-treated hollow raw pipe 1S at approximately 900° C. to approximately 1200° C. inclusive.

An appropriate method such as heating in a heating furnace, electrical heating, or high-frequency induction heating may be used as the heating method. Electric heating makes it possible to heat-treat the hollow raw pipe 1S with decarbonization and deboronization inhibited by its rapid heating. For this reason, it is preferable to use the electric heating.

After heated to approximately 900° C. to approximately 1200° C. inclusive, the hollow raw pipe 1S is bent by die-forming. The forming at approximately 900° C. or lower makes the processing easy because the forming is performed at high temperature higher than the recrystallization temperature of the metal.

It should be noted that the bending may be performed at approximately 720° C. or lower.

The bending at approximately 720° C. or lower requires larger force to be applied to the hollow raw pipe 1S because the metal is not soft unlike in the forming at approximately 900° C. to approximately 1200° C. inclusive.

With this taken into consideration, the bending using various benders is performed instead of the die-forming. In the case of the bending using benders, the heating temperature is lower than the recrystallization temperature of the metal, and the metal is not soft. For this reason, the bend-to-bend distance needs to be substantially as large as, or larger than the outer diameter.

In contrast to this, in the case of the bending at heating temperature equal to or higher than the recrystallization temperature of the metal, the metal is soft so that the bend-to-bend distance may be about a half of that required for the bending using benders. The die-forming at approximately 900° C. to approximately 1200° C. inclusive provides better workability.

Furthermore, the die-forming at approximately 900° C. to approximately 1200° C. inclusive provides higher mass productivity. As far as the forming step S10 is concerned, the mass productivity is twice or more as high as that expected from the bending using benders.

The hollow raw pipe 1S is bent by die-forming. Thereby, the torsion section 1a, the arm sections 1b and the bent sections 1c are formed in the hollow raw pipe 1S. Accordingly, the shape of the hollow raw pipe 1S is made close to the shape desired for the hollow stabilizer 1.

It should be noted that depending on a desired product shape, the bending may be applied to multiple parts of the hollow raw pipe 1S in order to form multiple bent sections 1c. In other words, the hollow raw pipe 1S may be bent by die-forming at multiple times to form multiple bent sections 1c, the torsion section 1a and the arm sections 1b.

The quenching step S20 is a step of: heating the bent hollow raw pipe 1S to high temperature (for example, approximately 900° C. or lower); and thereafter cooling the resultant hollow raw pipe 1S with coolant. A medium with a heat transfer coefficient equal to, higher than or close to that of water is used as the coolant. In other words, the quenching step S40 is a quenching step of: subjecting the bent hollow raw pipe 1S to austenitization by heating; and thereafter cooling the resultant hollow raw pipe 1S at a cooling rate equal to or greater than a lower critical cooling rate.

It is preferable that the heat transfer coefficient of the coolant be within a range of 10% less than the heat transfer coefficient value of water static or flowing relative to the hollow raw pipe 1S to 10% more than that thereof. The quenching temperature, the heating rate and the quench holding time each may be determined within an appropriate range. It is preferable, however, that the quenching temperature be not higher than the austenitization temperature (AC3) plus 100° C. from viewpoints of: preventing austenite crystal grains from becoming excessively coarse; and avoiding the occurrence of quenching crack. After heating like this, the hollow raw pipe 1S is cooled with the coolant, and thereby the metallographic structure of the hollow raw pipe 1S is formed into a martensitic structure.

The heating of the hollow raw pipe 1S may be performed by using a carburizing agent in combination. In other words, in the quenching step S20, the hollow raw pipe 1S may be subjected to carburizing and quenching. Any one of the solid carburizing method, the gas carburizing method and the liquid carburizing method may be used as the carburizing method. The solid carburizing method is performed using charcoal or bone char in combination with a carburization accelerator such as barium carbonate ($BaCO_3$). The gas carburizing method is performed by heating the metal in a furnace where a gas, such as a carbon-bearing natural gas, mixed with air is incompletely combusted. The liquid carburizing method is performed by heating the metal in a bath of salt containing NaCN or the like as its main component. The carburization temperature is approximately 750° C. to approximately 950° C. Incidentally, the carburization may be performed in a subsequent step.

To put it specifically, the quenching is preferably water quenching, aqueous solution quenching, or salt water quenching. Water quenching is a quenching process using water as the coolant. The temperature of the water may be on the order of 0° C. to 100° C. inclusive, and preferably within a temperature range of 5° C. to 45° C. inclusive. The aqueous solution quenching (polymer quenching) is a quenching process using a polymer-added aqueous solution as the coolant.

Various polymers, such as polyalkylene glycol and polyvinylpyrrolidone, may be used as the polymer. The polymer concentration is not specifically limited as long as the heat transfer coefficient is at the above-mentioned predetermined value. The polymer concentration may be controlled depending on the polymer type, and the quenching target set for the hollow raw pipe 1S to be treated.

The salt water quenching is a quenching process using an aqueous solution, to which a salt such as sodium chloride is added, as the coolant. The salt concentration is not specifically limited as long as the heat transfer coefficient is at the above-mentioned predetermined value. The salt concentration may be controlled depending on the degree to which the hollow raw pipe 1S to be treated is quenched. In these quenching processes, the coolant may be agitated and circulated, or does not have to be agitated or circulated.

In this embodiment, water is used as the coolant, and is circulated in order to inhibit a rise in temperature of the water in the quenching bath (not illustrated).

Figure 5A:
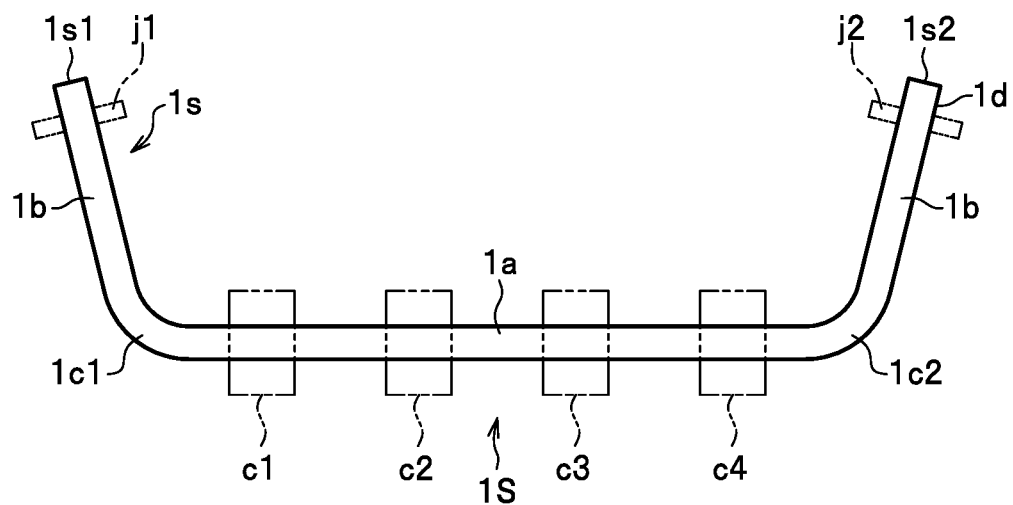
FIG. 5A is a top diagram illustrating how a bent hollow raw pipe is quenched in water.
Figure 5B:
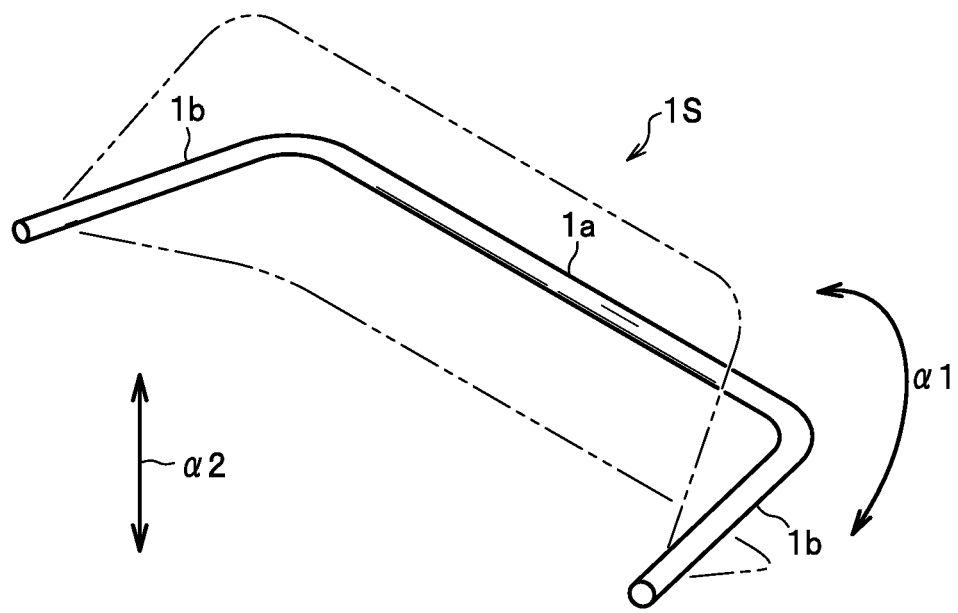
FIG. 5B is a perspective schematic view diagonally from above illustrating how the bent hollow raw pipe is swung while the hollow raw pipe is being quenched in water.

FIG. 5A is a top diagram illustrating how the bent hollow raw pipe 1S is quenched in water. FIG. 5B is a perspective schematic view diagonally from above illustrating how the bent hollow raw pipe 1S is swung while the hollow raw pipe 1S is being quenched in water.

While as illustrated in FIG. 5A, the bent hollow raw pipe 1S is being quenched in water, the hollow raw pipe 1S is likely to be thermally deformed.

For this reason, the torsion section $1a$ corresponding to a straight pipe part of the hollow raw pipe 1S is clamped with clamps c1, c2, c3, c4 before the water quenching starts. The clamps c1, c4 are arranged at a distance from the bent sections $1c$ of the torsion section $1a$ in order to prevent the quenching of the bent sections $1c$ from being hindered.

It is taken into consideration that the areas of the parts of the torsion section $1a$ to be clamped (held) with the clamps c1, c2, c3, c4 are minimized in order to prevent the parts from being insufficiently cooled.

Furthermore, the clamps c1, c2, c3, c4 are substantially symmetrically arranged at substantially equal intervals as far from each other as possible. This makes it possible to equally inhibit the deformation of the hollow raw pipe 1S as much as possible. Before the quenching starts, the hollow raw pipe 1S is moved. For this reason, parts of the respective arm sections $1b$, $1b$ are supported by supports j1, j2.

Thereby, the hollow raw pipe 1S is integrally fixed to a quenching jig J, while the hollow raw pipe 1S is being quenched in water.

Thus, the hollow raw pipe 1S fixed to the quenching jig J as illustrated in FIG. 5B is quenched while swung back and forth in the water as the coolant by the quenching jig as indicated with arrows α1, α2. In other words, restrained quenching is performed.

The restrained quenching with the hollow raw pipe 1S clamped makes it possible to inhibit the bent hollow raw pipe 1S from being thermally deformed by cooling.

Figure 6B:
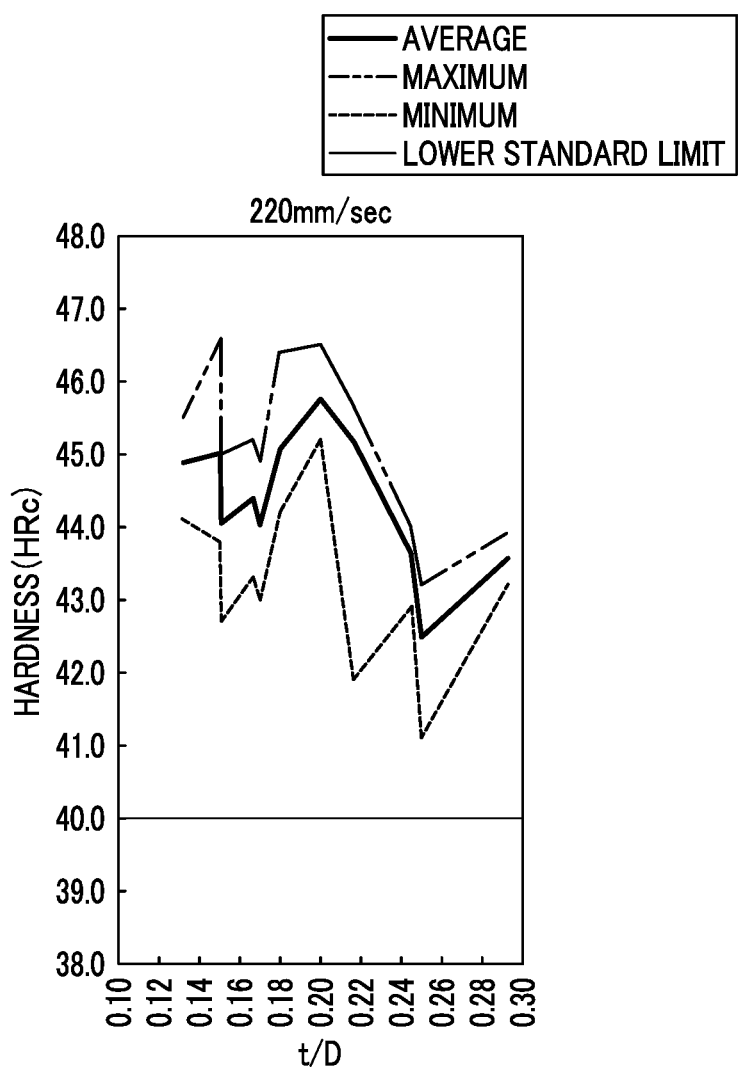
FIG. 6B is a diagram for comparing a Rockwell hardness (HRC) of the hollow raw pipe swung at a swing speed of 220 mm/sec.

FIGS. 6A to 6C are diagrams for comparing a Rockwell hardness (HRC) of the hollow raw pipe 1S not swung during the water quenching, a Rockwell hardness (HRC) of the hollow raw pipe 1S swung at a swing speed of 220 mm/sec during the water quenching, and a Rockwell hardness (HRC) of the hollow raw pipe 1S swung at a swing speed of 500 mm/sec during the water quenching. The horizontal axis represents t (plate thickness)/D (outer diameter), and the vertical axis represents the Rockwell hardness (HRC). Rockwell Hardness 40.0 represents the lower standard limit. The chain double-dashed line represents the maximum value of the hardness. The dashed line represents the minimum value of the hardness. The solid line represents the average value of the hardness.

As illustrated in FIG. 6A, in the case where the hollow raw pipe 1S was not swung, the result was that the hardness was lower than the lower standard limit when t/D was 0.15 to 0.16, and 0.20 to 0.24.

Meanwhile, in the case where the hollow raw pipe 1S was swung at the swing speed of 220 mm/sec during the quenching, the hardness was no longer lower than the lower standard limit at any t/D, as illustrated in FIG. 6B. Accordingly, the lower limit of the hardness became higher.

Furthermore, in the case where the hollow raw pipe 1S was swung at the swing speed of 500 mm/sec during the quenching, the hardness increased compared with the hardness of the hollow raw pipe 1S swung at the swing speed of 220 mm/sec, as illustrated in FIG. 6C. It is clear that the hardness more evenly shifted in a higher direction.

From the above examination, it was found that the preferable hardness was obtained while the swing speed was 500 mm/sec plus/minus 150 mm/sec, that is, about 350 mm/sec to about 650 mm/sec inclusive. In a case where the swing speed was less than about 350 mm/sec, the swing speed was too low (the relative speed between the coolant and the hollow raw pipe 1S was too low). Thus, the heat transfer coefficient became lower, and the cooling rate became accordingly lower. On the other hand, in a case where the swing speed was greater than about 650 mm/sec, the swing speed was too high (the relative speed between the coolant and the hollow raw pipe 1S was too high). Thereby, a time length for which water contacts the surface of the hollow raw pipe 1S became shorter. Thus, the heat transfer coefficient became lower, and the cooling rate became accordingly lower.

Accordingly, the swinging of the hollow raw pipe 1S at the swing speed of 350 mm/sec to about 650 mm/sec inclusive during the water quenching makes it possible to cool the hollow raw pipe 1S with water as the coolant effectively and efficiently, and to increase and homogenize the quenching hardness.

It should be noted that the configuration may be such that the hollow raw pipe 1S is not swung in a case where actions such as changing the coolant type, increasing the circulation rate of the coolant, and decreasing the temperature of the coolant are taken.

<Quenching Using Outer Surface Jets>

Figure 7:
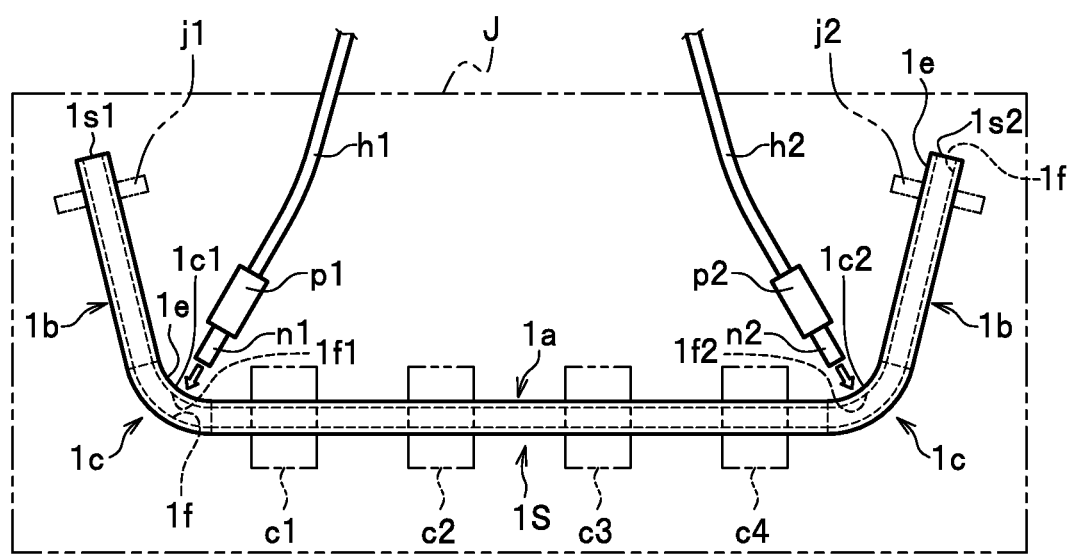
FIG. 7 is a top diagram illustrating how the inner sides of the bent sections of the bent hollow raw pipe are locally quenched from their outer surfaces.

FIG. 7 is a top diagram illustrating how the inner sides of the bent sections $1c$ of the bent hollow raw pipe 1S are locally quenched from their outer surfaces.

It should be noted that as discussed above, in the case where the hollow raw pipe 1S is thick, there is likelihood that the inner sides $1c1$, $1c2$ of the bent sections $1c$, $1c$ (see FIGS. 1A and 1B) are not fully quenched.

For example, in a case where the t (plate thickness)/D (outer diameter) is 0.18 to 0.275, the plate thickness of the hollow raw pipe 1S is thick. As a result, the hollow raw pipe 1S is likely to be insufficiently quenched. In this case, the quenching is performed using outer surface jets.

The quenching using the outer surface jets is a process of, during the water quenching, rapidly cooling the inner sides $1c1$, $1c2$ of the bent sections $1c$, $1c$ of the bent hollow raw pipe 1S by continuously jetting jet water streams, as jet streams of the coolant, onto the outer surfaces $1e$ of the inner sides $1c1$, $1c2$, respectively, as illustrated in FIG. 7. The jet stream of the coolant may be a jet stream of a liquid rather than water, or a jet stream of a gas, for example, a gas using "Colder" (product name) or the like. Use of a jet stream of a gas has an effect of preventing rusting of the metal-made hollow stabilizer 1, and an effect to simplifying the production line.

To put it specifically, a nozzle n1 for jetting water onto the inner side $1c1$ of one bent section $1c$ is connected to the distal end of a hose h1 with a small-sized underwater pump p1 interposed in between. Meanwhile, a nozzle n2 for jetting water onto the inner side $1c2$ of the other bent section $1c$ is connected to the distal end of a hose h2 with a small-sized underwater pump p2 interposed in between. At least the nozzles n1, n2 are integrally fixed to the quenching jig J. The nozzles n1, n2 jet water while their position relative to the hollow raw pipe 1S remain unchanged. The hoses h1, h2 each may be a flexible pipe with a bellows structure which is made of rubber, resin, or metal such as stainless steel (SUS). The hoses h1, h2 are not specifically limited as long as they fulfill a function of smoothly supplying water as the coolant for a long time, which includes flexibility and rust prevention.

During the quenching, the distal end of one nozzle n1 is directed toward the inner side 1c1 of the one bent section 1c of the bent hollow raw pipe 1S in swing motion. The small-sized underwater pump p1 pumps up water as the coolant from the inside of the hose h1. Thereby, the jet water stream from the nozzle n1 hits the outer surface of the inner side 1c1 of the one bent section 1c. Thus, the inner side 1c1 is rapidly cooled (quenched). At the same time, the distal end of the other nozzle n2 is directed toward the inner side 1c2 of the other bent section 1c of the hollow raw pipe 1S. The small-sized underwater pump p2 pumps up water from the inside of the hose h2. Thereby, the jet water stream from the nozzle n2 hits the outer surface of the inner side 1c2 of the other bent section 1c. Thus, the inner side 1c2 is rapidly cooled (quenched).

Incidentally, the examination result suggests that it is preferable that: the flow rate of the outer surface jet onto each of the inner sides 1c1, 1c2 of the bent sections 1c of the hollow raw pipe 1S be 8.5 liter/min or higher; and the flow velocity thereof be 2000 mm/sec or higher.

In a case where the jet flow rate was lower than 8.5 liter/min and the flow velocity was lower than 2000 mm/sec, the result was that the cooling rate of each bent section 1c of the hollow raw pipe 1S became lower.

The preferable jet flow rate and flow velocity make it possible to quench the inner sides 1c1, 1c2 of the bent sections 1c of the bent hollow raw pipe 1S more fully.

<Effect of Outer Surface Jets>

Figure 8:
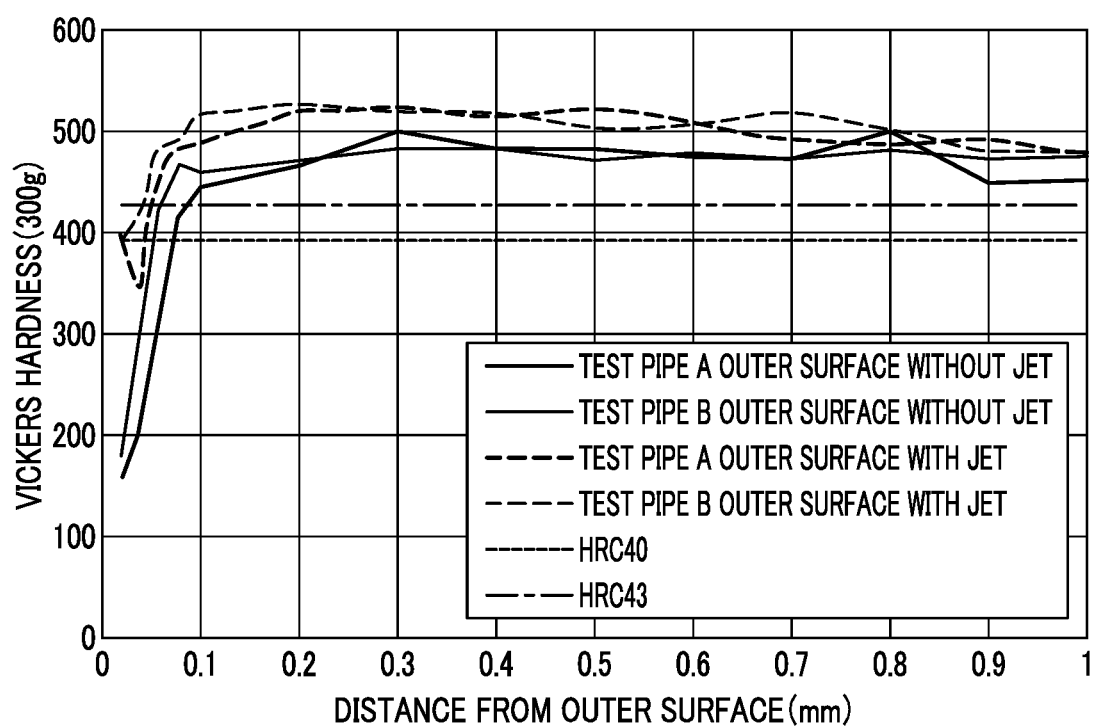
FIG. 8 is a diagram showing an effect of an outer surface jet in terms of hardness.

FIG. 8 is a diagram showing an effect of the outer surface jets in terms of hardness. The horizontal axis represents a depth (distance) from the surfaces the inner sides 1c1, 1c2 of the bent sections 1c of the hollow raw pipe 1S, and the vertical axis represents a Vickers hardness. Incidentally, load applied by the indenter for the Vickers hardness test was 300 gf. FIG. 8 shows Rockwell hardness HRC40, HRC43 for a reference purpose.

For each of test pipes A, B quenched using the outer surface jets or no outer surface jet, the Vickers hardness was measured. The thick solid line represents the Vickers hardness of the test pipe A quenched using no outer surface jet. The thick dashed line represents the Vickers hardness of the test pipe A quenched using the outer surface jets. The thin solid line represents the Vickers hardness of the test pipe B quenched using no outer surface jet. The thin dashed line represents the Vickers hardness of the test pipe B quenched using the outer surface jets.

In FIG. 8, the Vickers hardness represented by the solid dashed line and the Vickers hardness represented by the thin dashed line are greater. It is learned that the quenching using the outer surface jets increased the hardness of the test pipe A and the hardness of the test pipe B.

From the above, it was successfully confirmed that the hardenability was increased by quenching the inner sides 1c1, 1c2 of the bent sections 1c of the hollow raw pipe 1S using the outer surface jets of the coolant.

The above-discussed outer surface jets of the coolant may be applied with the hollow raw pipe 1S not dipped in the coolant.

The tempering step S30 (see FIG. 4) is a step of tempering the quenched hollow raw pipe 1S. Tempering is a heating and cooling process of: making a quench-induced pseudo-stable metallographic structure closer to a stable structure by causing it to undergo transformation and precipitation; and thereby providing the hollow raw pipe with required characteristic and state (particularly making the hollow raw pipe as tough as it needs to be). Heating is performed at temperature equal to or lower than the Ac1 transformation point in a heating furnace, or by electrical heating or high-frequency induction heating. Cooling may be performed using an arbitrary method such as water-cooling.

Table 1 shows chemical compositions of test pipes C, D used for a fatigue test corresponding to the tempering.

TABLE 1

| Steel | Chemical Components | | | | | | | |
|---|---|---|---|---|---|---|---|---|
| | C | Si | Mn | P | S | Cr | B | Others |
| Test Pipe C | 0.24 | 0.18 | 0.40 | 0.009 | 0.004 | 0.25 | 0.0042 | Fe and others |
| Test Pipe D | 0.30 | 0.20 | 1.30 | 0.015 | 0.004 | | 0.0010 | |

FIG. 9 is an S-N diagram illustrating a comparison of: the durability of the test pipe C which was obtained by forming the hollow raw pipe at approximately 900° C. to approximately 1200° C. inclusive, and thereafter tempered at tempering temperature of 350° C.; and the durability of each of test pipes D which were obtained by forming the hollow raw pipe at approximately 900° C. to approximately 1200° C. inclusive, and thereafter tempered respectively at tempering temperatures of 350° C. and 400° C. The horizontal axis represents the endurance cycles (the number of times of repetitions), and the vertical axis represents the stress amplitude (MPa) (fatigue strength). In FIG. 9, for a reference purpose, the chain line represents the 50% breakage probability (average) of a conventional hollow raw pipe only water-quenched in the Weibull distribution, and the dashed line represents the 10% breakage probability (average) of the conventional hollow raw pipe only water-quenched in the Weibull distribution.

A black circle "●" represents the life (the number of cycles at fatigue failure) of the test pipe C which was obtained by forming the hollow raw pipe 1S at approximately 900° C. to approximately 1200° C. inclusive in the forming step S10 and thereafter was tempered by being heated to 350° C. A black diamond "+" represents the life (the number of cycles at fatigue failure) of the test pipe D which was obtained by forming the hollow raw pipe 1S at approximately 900° C. to approximately 1200° C. inclusive in the forming step S10 and thereafter was tempered by being heated to 350° C. A black square "■" represents the life (the number of cycles at fatigue failure) of the test pipe D which was obtained by forming the hollow raw pipe 1S at approximately 900° C. to approximately 1200° C. inclusive in the forming step S10 and thereafter was tempered by being heated to 400° C.

As illustrated in FIG. 9, it was found that the test pipes C, D each obtained by forming the hollow raw pipe 1S at approximately 900° C. to approximately 1200° C. inclusive in the forming step S10 acquired a life similar to that of a conventional one when they were tempered at either of tempering temperatures of 350° C. and 400° C.

FIG. 10 is an S-N diagram illustrating a comparison of the durabilities of the steel D shaped at approximately 720° C. or lower and tempered at tempering temperatures of 250° C. and 300° C. The horizontal axis represents the endurance cycles (the number of times of repetitions), and the vertical axis represents the stress amplitude (MPa) (fatigue strength). In FIG. 10, for a reference purpose, the chain line represents the 50% breakage probability (average) of a conventional hollow raw pipe only water-quenched in the Weibull distribution, and the dashed line represents the 10% breakage probability (average) of the conventional hollow raw pipe in the Weibull distribution. A black triangle "▲" represents the life (the number of cycles at fatigue failure) of the test pipe D which was tempered by being heated to 250° C. A black square "■" represents the life (the number of cycles at fatigue failure) of the test pipe D which was tempered by being heated to 300° C.

It was confirmed that the hollow raw pipe 1S formed at approximately 720° C. or lower in the forming step S10 had a better durability when it was tempered by being heated to 300° C. than when it tempered by being heated to 250° C.

From these examinations, it was found that for the hollow stabilizer 1 obtained by forming the hollow raw pipe at approximately 720° C. or lower, the heating temperature for the tempering was preferably approximately 200° C. to approximately 290° C., and most preferably approximately 230° C. to approximately 270° C.

The pipe end machining step S40 (see FIG. 4) is a step of: machining the two end portions of the bent hollow raw pipe 1S; and thereby forming the connecting portions 1d, 1d to be connected to the stabilizer links 2,2 (see FIGS. 1A and 1B), respectively, in the two end portions thereof.

In the pipe end machining step S40, each distal end of the bent hollow raw pipe 1S is plastically deformed into a flat shape by pressure-forming using a press, and thereafter a hole is made in the resultant distal end using a drilling die. Thereby, the connecting portions 1d, 1d including the respective attachment holes 1d1, 1d1 are formed in the distal ends of the bent hollow raw pipe 1S. Incidentally, no specific restriction is imposed on the shape of the connecting portions 1d, 1d, or a method of forming the connecting portions 1d, 1d.

The surface treatment step S50 (see FIG. 4) is a step of subjecting the quenched bent hollow raw pipe 1S to shot-peening. The shot-peening may be performed either at approximately 900° C. or higher or approximately 720° C. or higher. The shot-peening may be performed repeatedly multiple times by changing the particle diameter and the peening velocity. The shot-peening adds compressive residual stress to the surface of the hollow stabilizer 1, and thereby enhances the fatigue strength and abrasion resistance, as well as thus prevents the season cracking and stress corrosion cracking. The shot-peening is effective in enhancing the durability of the hollow stabilizer 1 where t/D is approximately 0.18 or less.

The coating step S60 (see FIG. 4) is a step of coating the hollow raw pipe is.

The hollow raw pipe 1S is subjected to surface cleaning and surface treatment before a coating process is performed on the hollow raw pipe 1S. The surface of the hollow raw pipe 1S is subjected to various pretreatments such as: a removal process of removing oils, foreign objects and the like from the surface; and a surface preparation. As the surface preparation, for example, a coating layer of zinc phosphate, iron phosphate or the like may be formed on the surface of the hollow raw pipe 1S.

Thereafter, the hollow raw pipe 1S is preheated. The preheating before the coating makes it possible to enhance the coating efficiency. Furthermore, the preheating before the coating makes it possible to prevent a rise in temperature of the coating material from unevenly concentrating in the surface side of the hollow raw pipe 1S, and accordingly to enhance the adhesion of the coating layer to the surface of the hollow raw pipe 1S. As the heating method, an appropriate method, such as heating in a heating furnace or infrared heating, may be used. Incidentally, in a case where as a pretreatment, moisture is evaporated by heat-drying, residual heat remaining after the heat-drying may be used to apply the coating material. For this reason, in a case where the temperature of the heat-drying for evaporating the moisture is sufficiently high, the coating may be performed without pre-heating after the pretreatments.

Thereafter, the hollow raw pipe 1S is coated with the coating material. It is preferable that a powder coating material be used as the coating material. Preferably, a powder coating material made from epoxy resin may be used, for example. As the coating method, for example, a method of spraying the coating material onto the surface of the hollow stabilizer 1 such that a coating layer with a thickness of approximately 50 μm or more is formed on the surface of the hollow stabilizer 1, or a method of dipping the hollow stabilizer 1 into the coating material may be used.

As the coating process, electrodeposition coating, solvent coating, or the like may be performed.

The hollow stabilizer 1 (see FIG. 1B) can be produced through the above-discussed steps.

«Another Example of Cooling Method for Quenching»
<Quenching Using Inner Surface Jets>

For the purpose of enhancing the hardenability of the inner sides 1c1, 1c2 of the bent sections 1c of the hollow raw pipe 1S, quenching using inner surface jets of the coolant is performed such that the hollow raw pipe 1S is locally quenched from inner surfaces 1f.

For example, in a case where the t (plate thickness)/D (outer diameter) is 0.25 to 0.275, the plate thickness of the hollow raw pipe 1S is thick. As a result, the hollow raw pipe 1S is likely to be insufficiently quenched. In this case, the quenching using inner surface jets is effective.

Figure 11:
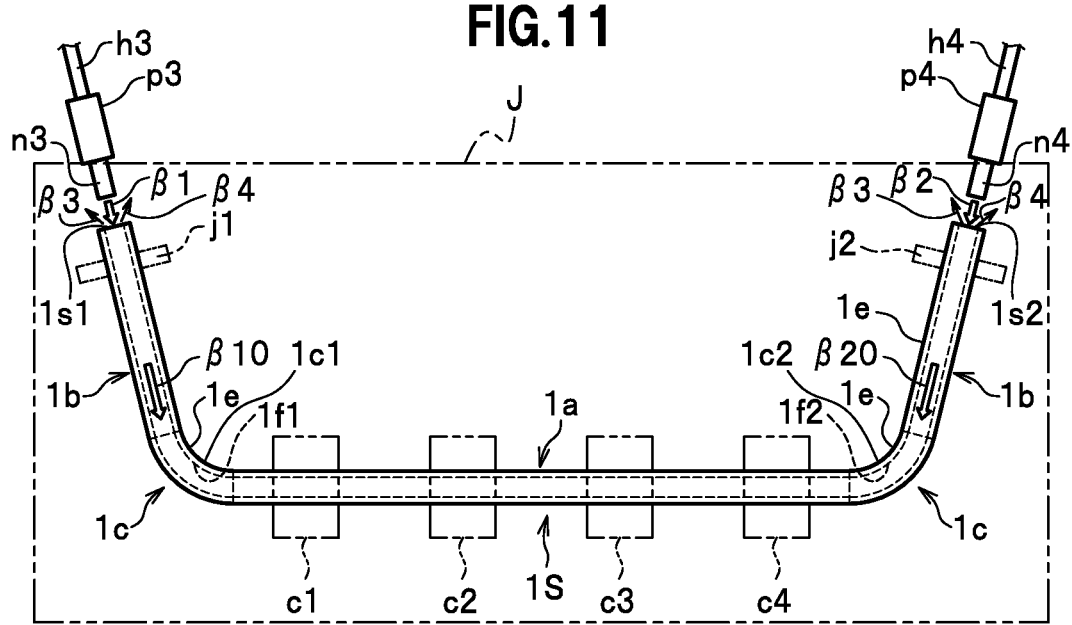
FIG. 11 is a top diagram illustrating how the bent hollow raw pipe is locally quenched from its inner surfaces in a quenching method using inner surface jets.

FIG. 11 is a top diagram illustrating how the bent hollow raw pipe 1S is locally quenched from the inner surfaces in the quenching method using the inner surface jets.

The quenching using the inner surface jets is performed as follows.

Nozzles n3, n4 each corresponding to the inner diameter of the hollow raw pipe 1S are arranged at a distance from pipe ends 1s1, 1s2 of the openings in the two end portions of the hollow raw pipe 1S. The diameter of the nozzles n3, n4 is determined as appropriate corresponding to the inner diameter of the hollow raw pipe 1S.

Flexible hoses h3, h4 are connected to the nozzles n3, n4 with small-sized underwater pumps p3, p4 interposed in between, respectively. The hoses h3, h4 each may be a flexible pipe with a bellows structure which is made of rubber, resin, or metal such as stainless steel (SUS). The hoses h3, h4 are not specifically limited as long as they fulfill a function of smoothly supplying water as the coolant for a long time, which includes flexibility and rust prevention.

The nozzles n3, n4, the small-sized underwater pumps p3, p4, and the like are fixed to the quenching jig J to which the hollow raw pipe 1S is clamped, and are accordingly swung integrally with the hollow raw pipe 1S. In other words, while the hollow raw pipe 1S is being cooled in the quenching step, the positions of the nozzles n3, n4 relative to the hollow raw pipe 1S remain unchanged.

The small-sized underwater pumps p3, p4 pump up water, respectively, from the insides of the hoses h3, h4. Thereby, jet water streams are jetted, respectively, from the nozzle n3, n4 into the pipe ends 1s1, 1s2 of the openings in the two end portions of the hollow raw pipe 1S (the white arrows 131, (2 in FIG. 11).

After entering the hollow raw pipe 1S from one pipe end 1s1, the jet water stream flows inside the pipe (the white arrow (10 in FIG. 11), rapidly cools inner surfaces 1f1, 1f2 of the two bent sections 1c, 1c sequentially, and eventually is discharged from the other pipe end 1s2 (the white arrow (3 in FIG. 11).

Similarly, after entering the hollow raw pipe 1S from the other pipe end 1s2, the jet water stream flows inside the pipe (the white arrow (20 in FIG. 11), rapidly cools the inner surfaces 1f1, 1f2 of the two bent sections 1c, 1c sequentially, and eventually is discharged from the one pipe end 1s1 (the white arrow (4 in FIG. 11).

Since the nozzles n3, n4 are arranged away from the pipe ends 1s1, 1s2 of the hollow raw pipe 1S, the nozzles n3, n4 do not hinder the discharges (the white arrows β3, β4 in FIG. 11) of the jet water streams. Incidentally, the diameters of the nozzles n3, n4 may be set as appropriate in a way that enables the nozzles n3, n4 to jet the jet water streams in the two directions.

Since as discussed above, the nozzles n3, n4 jet the jet water streams into the pipe ends 1s1, 1s2 of the hollow raw pipe 1S such that the jet water streams are symmetrical with respect to the hollow raw pipe 1S, the cooling rate and the cooling temperature are symmetrical in the left-right direction. Thereby, the hollow raw pipe 1S can be quenched more homogeneously with high quality.

Incidentally, the examination result suggests that it is preferable that: the flow rate of each inner surface jet into the hollow raw pipe 1S be 8.5 liter/min or higher; and the flow velocity thereof be 2000 mm/sec or higher.

In a case where the jet flow rate was less than 8.5 liter/min and the flow velocity was less than 2000 mm/sec, the result was that the cooling rate of each bent section 1c of the hollow raw pipe 1S became lower.

<Effect of Quenching Using Inner Surface Jets>

Figure 12:
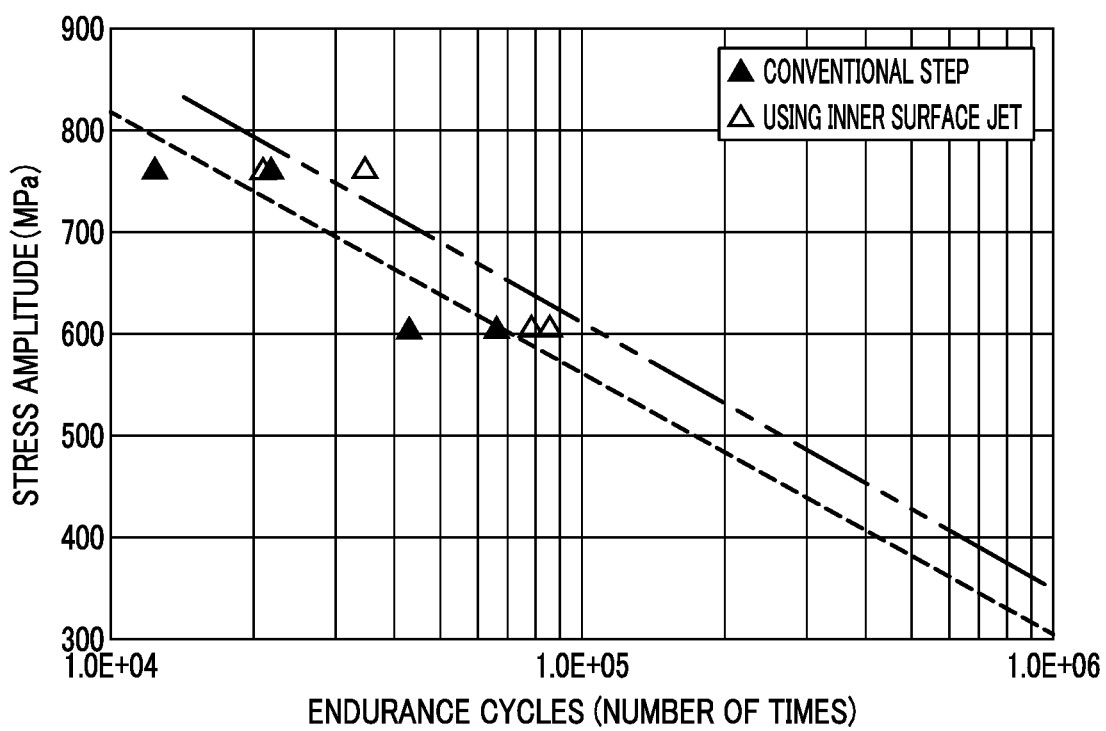
FIG. 12 is an S-N diagram illustrating a comparison based on a fatigue test between an effect of combination of water quenching with quenching using the inner surface jets and an effect of the water quenching using no inner surface jets.

FIG. 12 is an S-N diagram illustrating a comparison based on a fatigue test between an effect of combination of water quenching with quenching using the inner surface jets and an effect of the water quenching using no inner surface. The horizontal axis represents the endurance cycles (the number of times of repetitions), and the vertical axis represents the stress amplitude (MPa) (fatigue strength). In FIG. 12, the chain line represents the 50% breakage probability (average) of a conventional hollow raw pipe only water-quenched in the Weibull distribution, and the dashed line represents the 10% breakage probability (average) of the conventional hollow raw pipe in the Weibull distribution.

A black triangle "▲" represents the number of cycles at fatigue failure of the conventional hollow raw pipe 1S only quenched in water. A white triangle "△" represents the number of cycles at fatigue failure of the hollow raw pipe 1S of the embodiment which was quenched in water and additionally quenched using the inner surface jet streams.

As shown in FIG. 12, the number of cycles at fatigue failure was higher in the case where the quenching was performed using the inner surface jets (△) than in the case where the quenching was performed using no inner surface jet (▲). Accordingly, it was confirmed that the water quenching using the inner surface jets enhanced the durability It should be noted that the jetting of the coolant from the nozzle n3 and the jetting of the coolant from the nozzle n4 alternate with each other.

It is a matter of course that an effect of heat-treating the hollow stabilizer 1 by rapid cooling can be obtained even from a jet stream of a gas such as a gas whose product name is "colder." In addition, it is possible to obtain an effect of making the production line of the hollow stabilizer 1 simple and clean.

<Cooling Method Using Another Inner Surface Jet for Quenching>

FIG. 13 is a top diagram illustrating how the bent hollow raw pipe 1S is quenched from its inner surface in a quenching method using another inner surface jet.

The quenching method using the second inner surface jet is performed as follows.

A nozzle n5 is arranged facing, and at an appropriate distance from, the pipe end 1s1 of one opening of the hollow raw pipe 1S. The diameter of the nozzle n5 is determined as appropriate corresponding to the inner diameter of the hollow raw pipe 1S.

A pipe-shaped jet guard g1 for allowing a jet water stream discharged from the pipe end 1s2 to flow through at a reduced flow velocity is arranged surrounding the pipe end 1s2 of the other opening of the hollow raw pipe 1S.

A flexible hose h5 is connected to the nozzle 5 with a small-sized underwater pump p5 interposed in between. The hose h5 is made arbitrarily from rubber, resin, metal or the like.

The nozzle n5, the jet guard g1 and the like are fixed to the quenching jig J to which the hollow raw pipe 1S is clamped, and are accordingly swung integrally with the hollow raw pipe 1S. In other words, while the hollow raw pipe 1S is being cooled in the quenching step, the positions of the nozzle n5 and the jet guard g1 relative to the hollow raw pipe 1S remain unchanged.

The small-sized underwater pump p5 pumps up water from the inside of the hose h5. Thereby, a jet water stream is jetted from the nozzle n5 into the pipe end 1s1 of the opening in the one end portion of the hollow raw pipe 1S (the white arrow β5 in FIG. 13).

After entering the hollow raw pipe 1S from the one pipe end 1s1, the jet water stream flows inside the pipe (the white arrow β50 in FIG. 13), rapidly cools the inner surfaces 1f1, 1f2 of the respective bent sections 1c sequentially, and eventually is discharged from the other pipe end 1s2 (the white arrow (6 in FIG. 13).

The second inner surface jet enhances the hardenability of the inner surfaces 1f1, 1f2 of the bent sections 1c1, 1c2 of the hollow raw pipe 1S.

It should be noted that the deformation of the hollow raw pipe 1S due to the quenching is more inhibited in the case where the jet water streams flow from the pipe ends 1s1, 1s2 of the openings in the two end portions of the hollow raw pipe 1S.

<Selection of Methods of Manufacturing Hollow Stabilizer 1 Depending on t/D>

As shown in FIG. 3, in the case where t/D is less than approximately 0.18, the outer surface stress and the inner surface stress increase quickly as t/D becomes lower. For this reason, shot-peening, and carburization of increasing the hardness of the inner surface more by forming a high-carbon alloy layer at the surface via the diffusion of carbon from the surface are performed.

Furthermore, in the case where the plate thickness t of the hollow stabilizer 1 is large and t/D is approximately 0.18 to 0.275, the inner sides 1c1, 1c2 of the bent sections 1c of the hollow stabilizer 1 are likely to be insufficiently quenched, as discussed above.

For this reason, in the range of t/D of approximately 0.18 to 0.275, the insufficient quenching is solved by: quenching the hollow stabilizer 1 while cooling the inner sides 1c1, 1c2 of the bent sections 1c of the hollow stabilizer 1 by jetting the coolant onto the inner sides $1c1$, $1c2$; and thereby increasing the hardness of the inner sides $1c1$, $1c2$ of the bent sections $1c$ of the hollow stabilizer 1.

In the case where t/D is approximately 0.18 to approximately 0.275, the quenching is performed in which the hollow stabilizer 1 is swung while dipped in water or the like as the coolant. In addition, the quenching using the outer surface jet streams is performed in order to increase the hardness of the inner sides $1c1$, $1c2$ of the bent sections $1c$ of the hollow stabilizer 1.

Particularly in the case where t/D is approximately 0.25 to approximately 0.275, the quenching using the inner surface jet streams may be performed together, since the larger plate thickness t makes the bent sections $1c$ more likely to be insufficiently quenched.

In the case where t/D is approximately 0.275 or greater, the hardness of the inner surface may be low, since the outer surface stress is equal to that of the solid stabilizer whereas the inner surface stress is relative low. In other words, the quenching may be performed in which the hollow stabilizer is swung while dipped in water or the like as the coolant.

Thereby, the hollow stabilizer 1 can be realized in which the hardness of the outer surfaces $1e$ of the inner sides $1c1$, $1c2$ of the bent sections $1c$ of the hollow stabilizer 1 is at least approximately 70% of the hardness of the outer surface $1e$ of the arm section $1b$ of the hollow stabilizer 1.

It should be noted that the use of the jet streams makes it possible to make the hardness of the outer surfaces $1e$ of the inner sides $1c1$, $1c2$ of the bent sections $1c$ equal to or greater than approximately 70% of the hardness of the outer surface $1e$ of the arm section $1b$, although when no jet stream is used, the hardness of the outer surfaces $1e$ of the inner sides $1c1$, $1c2$ of the bent sections $1c$ is approximately 34% to approximately 40% of the hardness of the outer surface $1e$ of the arm section $1b$. As a result, it can be said that the hardness ratio of approximately 70% or more makes the hollow stabilizer reach the practical level.

Moreover, ingenious arrangement of the quenching using the jet streams makes it possible to make the hardness of the outer surfaces $1e$ of the inner sides $1c1$, $1c2$ of the bent sections $1c$ equal to or greater than approximately 80%, or even approximately 90%, of the hardness of the outer surface $1e$ of the arm section $1b$. In this respect, the hardness is based on the Rockwell hardness scale or the Vickers hardness scale.

The foregoing configurations bring about the following effects.

1. Since the coolant is continuously jetted onto the outer surfaces $1e$ of the inner sides $1c1$, $1c2$ of the bent sections $1c$ of the hollow stabilizer 1 in addition to the bent sections $1c$ of the hollow stabilizer 1 being quenched by being dipped in the coolant, it is possible to fully quench the parts of the hollow stabilizer 1 which are likely to be insufficiently quenched when the hollow stabilizer 1 is only dipped in the coolant. Furthermore, it is possible to increase the cooling rate of the hollow stabilizer 1 as a whole.

2. Since the coolant is continuously jetted onto the outer surfaces $1e$ of the inner sides $1c1$, $1c2$ of the two bent sections $1c$ of the hollow stabilizer 1 at the same time, the cooling rates of the outer surfaces $1e$ are equal to each other. Thus, it is possible to obtain the hollow stabilizer 1 in which the bent sections $1c$ symmetrical to each other equally have more homogeneous hardness.

3. Since the coolant is continuously jetted from one of the pipe ends $1s1$, $1s2$ of the openings in the end portions of the hollow stabilizer 1 onto the inner surfaces $1f$ of the bent sections $1c$ of the hollow stabilizer 1, it is possible to increase the hardness of the inner surfaces $1f1$, $1f2$ of the bent sections $1c$. In addition, it is possible to increase the cooling rate of the hollow stabilizer 1 as a whole.

4. Since the coolant is continuously jetted into the pipe ends $1s1$, $1s2$ of the openings in the two end portions of the hollow stabilizer 1 at the same time, the cooling rates of the inner surfaces $1f1$, $1f2$ of the bent sections $1c$ are equal to each other. Thus, it is possible to obtain the hollow stabilizer 1 in which the bent sections $1c$ symmetrical to each other have homogeneous and excellent hardness.

5. Since the swing speed at which to dip the hollow stabilizer 1 in the coolant is set not less than approximately 350 mm/sec but not greater than approximately 650 m/sec while the quenching is performed, it is possible to increase and homogenize the quenching hardness.

6. Since the hollow stabilizer 1 can be die-formed by being formed at approximately 900° C. to approximately 1200° C. inclusive, the shape freedom is higher than when the hollow stabilizer 1 is bent using forming benders at approximately 720° C. or lower. For example, die-bending makes it possible to make the bend-to-bend dimension unnecessary, although bender-bending requires the bend-to-bend distance to be equal to or greater than the diameter.

7. Since the hollow stabilizer 1 can be die-formed by being formed at approximately 900° C. to approximately 1200° C. inclusive, the productivity can be doubled or more than when the hollow stabilizer 1 is bent using forming benders at approximately 720° C. or lower.

8. Since the hollow stabilizer 1 can be die-formed by being formed at approximately 900° C. to approximately 1200° C. inclusive, a production line for solid stabilizers can be used.

9. Since quenching using a medium with a heat transfer coefficient equal to, greater than, or close to that of water, such as water quenching, aqueous solution quenching or salt water quenching, can be employed to quench the hollow stabilizer 1 instead of oil quenching, waste management and security as well as disposal costs, which would otherwise be required if oil-based coolants such as quenching mineral oils were used, are no longer needed. For example, quenching mineral oils are collected by waste collection service providers, and this incurs disposal costs. In contrast, water used for the water quenching of the embodiment can be discharged into receiving water after scales are removed therefrom.

This helps reduce costs of manufacturing hollow stabilizers 1, and also makes it possible to manufacture hollow stabilizers 1 efficiently.

10. Since as discussed above, the hardness of the outer surfaces $1e$ of the inner sides $1c1$, $1c2$ of the bent sections $1c$ can be made at least approximately 70% of the hardness of the outer surface $1e$ of the arm section $1b$ of the hollow stabilizer 1 with a large plate thickness, it is possible to achieve the hollow stabilizer 1 which has an improved fatigue resistance and an improved fatigue strength in spite of its lighter weight.

Other Embodiments

1. The cooling using the outer surface jets of the coolant toward the bent sections $1c$ of the hollow stabilizer 1 of the above-discusses embodiment, and the cooling using the inner surface jets of the coolant toward them may be performed solely or independently.

For example, the outer surface jets may be applied to the bent sections $1c$ of the hollow stabilizer 1 without applying the inner surface jets to them, and the inner surface jets may be applied to them without applying the outer surface jets to them. Furthermore, the outer surface jets or the inner surface jets may be applied without performing the quenching by dipping the hollow stabilizer 1 in the coolant.

2. The quenching of the bent hollow raw pipe 1S, discussed in the foregoing embodiment, at a cooling rate equal to or greater than the lower critical cooling rate after austenitization of the bent hollow raw pipe 1S may be achieved, for example, by jetting the coolant of cool air, a gas such as "colder" (product name), or a liquid rather than water, onto the outer surfaces 1e or the inner surfaces 1f of the inner sides 1c1, 1c2 of the bent sections 1c of the bent hollow raw pipe 1s.

3. Although the variety of configurations has been discussed in the foregoing embodiment, the configurations may be selectively used singly, or in combination by being selected as appropriate.

4. The foregoing embodiment has explained one example of the present invention. The present invention can be modified into various specific embodiments within the scope of claims or within the scope discussed in the embodiment.

REFERENCE SIGNS LIST 1 stabilizer (hollow stabilizer)
1a torsion section
1b arm section
1c bent section
1e outer surface
1f1, 1f2 inner surface
1s1, 1s2 pipe end
1S hollow raw pipe (raw pipe)

The invention claimed is:

1. A pipe-shaped hollow stabilizer provided to a vehicle, comprising:
a torsion section extending in a vehicle width direction;
an arm section extending in a vehicle front-rear direction; and
a bent section connecting the torsion section and the arm section, wherein
the torsion section, the arm section, and the bent section are quenched,
a hardness of an outer surface of an inner bend side of the bent section is at least 70% of a hardness of an outer surface of the arm section, and wherein
the hollow stabilizer has a metallographic structure, at least 90% of which has martensitic structure, and wherein
a rockwell hardness of each of the torsion section, the arm section, and the bent section is more than rockwell hardness of 40.0.

2. The hollow stabilizer according to claim 1, wherein t/D is equal to or greater than 0.18 but less than 0.5 where t and D denote a plate thickness and an outer diameter of the hollow stabilizer, respectively, and
quenching is performed with cooling by jetting a coolant onto the outer surface of the inner bend side of the bent section.

* * * * *